(12) United States Patent
Koslow (10) Patent No.: US 6,550,622 B2
(45) Date of Patent: *Apr. 22, 2003

(54) COMPOSITE FILTER MEDIUM AND FLUID FILTERS CONTAINING SAME

(75) Inventor: Evan E. Koslow, Weston, CT (US)

(73) Assignee: Koslow Technologies Corporation, Orange, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

(21) Appl. No.: 09/140,924

(22) Filed: Aug. 27, 1998

(65) Prior Publication Data

US 2002/0139746 A1 Oct. 3, 2002

(51) Int. Cl.[7] ............................ B01D 29/46; B01D 39/00
(52) U.S. Cl. .................... 210/490; 210/489; 210/502.1; 210/500.251; 210/505; 210/506; 210/508; 210/509
(58) Field of Search ................................ 210/489, 490, 210/500.27, 502.1, 505, 506, 507, 508, 509

(56) References Cited

U.S. PATENT DOCUMENTS

| | | | |
|---|---|---|---|
| 3,158,532 A | * | 11/1964 | Pall et al. .................... 210/505 |
| 3,238,056 A | * | 3/1966 | Pall et al. .................... 428/338 |
| 3,246,767 A | * | 4/1966 | Pall et al. .................... 210/505 |
| 3,573,158 A | * | 3/1971 | Pall et al. .................... 162/131 |
| 3,592,767 A | * | 7/1971 | Pall et al. .................... 210/490 |
| 4,828,698 A | | 5/1989 | Jewell et al. |
| 5,114,582 A | | 5/1992 | Sandstrom et al. |
| 5,417,743 A | | 5/1995 | Dauber |
| 5,792,513 A | * | 8/1998 | Koslow et al. ............. 427/195 |
| 5,874,000 A | * | 2/1999 | Herding ....................... 210/490 |

OTHER PUBLICATIONS

Technical Data on Hovoglas® Laminated Filter Media LL–5211 A–A by Hollingsworth & Vose Company (2 pages).

* cited by examiner

Primary Examiner—Ana Fortuna
(74) Attorney, Agent, or Firm—Shirley Ma (57) ABSTRACT

A composite filter medium for removing at least 99.95 percent of particulates of a size in the 3 to 4 micron range and dissolved chemical contaminants from a fluid and filters of various configurations employing the composite filter medium are disclosed. The composite filter medium comprises an adsorbent layer containing an adsorbent agent and a hydrophilic particulate intercepting layer disposed adjacent to the adsorbent layer. The composite medium has a mean flow pore diameter of about 1 to 10 microns, a bubble point of about 3 to 15 microns and an air permeability of about 0.5 to 7 liters per minute/cm$^2$ with a pressure drop of about 0.1 bar.

11 Claims, 11 Drawing Sheets

COMPOSITE FILTER MEDIUM AND FLUID FILTERS CONTAINING SAME

BACKGROUND OF THE INVENTION

1. Field of the Invention

The present invention relates to filters and filter media. More particularly, the present invention relates to a composite filter media for filtering contaminants from a fluid and fluid filters containing the composite filter medium.

2. Description of the Prior Art

Fluids, such as liquids or gases, typically contain contaminants which include particulates, chemicals, and organisms. In many cases, it is desirable to remove some or all of such contaminants from the fluid. Usually, contaminants are removed from a fluid supply by passing the fluid through a filter whereby the contaminants are separated from the filtered fluid or filtrate.

Water is probably the most highly filtered fluid as it is filtered in industrial processes as well as in the household. Purification of water to produce potable water often requires the simultaneous reduction of particulate contaminants, dissolved organic chemicals and inorganic heavy metals. Particulate contaminants may include dirt, rust, silt, and other particles as well as potentially hazardous microorganisms such as chlorine resistant protozoan cysts, such as *Cryptosporidium Parvum* or Giardia, or bacteria such as Cholera and *E. coli*. Organic chemicals may include those that contribute to taste and odor as well as potentially toxic pesticides, chlorinated hydrocarbons, and other synthetic organic chemicals. Free chlorine reduction is also a major objective when the residual concentration of this disinfectant is sufficiently high to cause a bad taste. The most common heavy metal found in domestic water is lead derived from brass fixtures, leaded solder, lead pipes or other sources. Other heavy metals often found in drinking water include copper, zinc, manganese and iron.

The most common household water filters are typically small trapezoidal shaped plastic containers filled with a loose adsorbent medium such as activated carbon, ion exchange resins or zeolites. Water is filtered by such water filters by passing it through the loose adsorbent medium in an axial direction from a wider to a narrower portion of the trapezoidal container.

The trapezoidal shaped filter element is often used in a carafe and when used in a carafe is typically called a gravity-flow carafe filter. Such filters are typically installed within a household carafe having an upper reservoir, a lower reservoir and a filter receptacle fitted at the bottom of the upper reservoir. The trapezoidal shaped filter element is installed in the carafe by wedging it into the receptacle so as to effect a seal between the two reservoirs. Water passing from the upper reservoir to the lower reservoir must pass through the filter element. Typically, water enters the filter element through a series of small perforations at the wider top of the trapezoid. The water flows through the filter to the narrower bottom while traversing the porous bed of loose adsorbent. The water passes through a series of micro perforations in the narrower bottom of the filter exiting into the lower reservoir. In some filters, one or more non-woven pads, functioning as a fines filter, may be installed at the bottom, top or both bottom and top of the filter element to prevent the release of fine particles from the adsorbent bed.

The flow rate through present day gravity-flow carafe filters as described above is generally slow, typically about 200 ml per minute for a filter loaded with 100 grams of mixed wet resin-carbon filter medium containing water in an amount of about 30 to 35 percent by weight. The slow flow rate occurs because: (1) the water must traverse a deep bed of adsorbent particles; (2) the filter operates in a low pressure environment—only the pressure of the overlying water in the upper reservoir, typically several inches of water, is available to force the water through the filter; and (3) the size of the adsorbent particles are limited. Excessively large particles that would permit faster flow rates, would also have slower adsorption kinetics. This forces the use of relatively small particles (about 35 mesh) having faster adsorption kinetics but greater flow restriction. In view of the above constraints, a liter of water normally takes about 5 to 10 minutes or more to process through the present day carafe filter.

It is desirable to have a high flow rate, gravity-flow carafe filter which is capable of intercepting the very small chlorine resistant cysts such as Giardia and *Cryptosporidium Parvum*. It is also desirable to provide a high flow rate, gravity-flow carafe filter with enhanced chlorine, taste and odor reduction as well as a filter that can absorb heavy metals such as lead. It is desirable to provide a high flow filter that supports high flow with a 1 inch water column and that intercepts 99.95 percent of 3 to 4 micron particles which makes it suitable for cyst reduction and which generally meets NSF Class 1 particle reduction requirements. Mass production of carafe filters with simple equipment and at low cost is a necessity.

SUMMARY OF THE INVENTION

It is a primary object of the present invention to provide a fluid filter that is capable of filtering contaminants from a fluid at relatively high flow rates while providing a relatively low resistance to fluid flow.

It is another object of the present invention to provide a fluid filter capable of filtering chlorine resistant cysts such as Giardia and *Cryptosporidium Parvum*.

It is yet another object of the present invention to provide a high flow rate carafe filter with enhanced chlorine, taste and odor reduction as well as a filter that can absorb heavy metals such as lead.

It is still another object of the present invention to provide a carafe filter that can be mass produced with simple equipment and at low cost.

In accordance with the objects of the present invention, the foregoing primary objective is realized by providing a low flow resistance composite filter medium for removing at least 99.95 percent of particulates of a size in the 3 to 4 micron range and dissolved chemical contaminants from a fluid comprising an adsorbent layer containing an adsorbent agent and a hydrophilic particulate intercepting layer disposed adjacent to the adsorbent layer. The composite medium has a mean flow pore diameter of about 1 to 10 microns, a bubble point of about 3 to 15 microns and an air permeability of about 0.5 to 7 liters per minute/cm$^2$ with a pressure drop of about 0.1 bar.

Other objects and advantages of the invention will be apparent from the following detailed description and the accompanying drawings.

BRIEF DESCRIPTION OF THE DRAWINGS

The drawings, not drawn to scale, include.

DETAILED DESCRIPTION OF THE PRESENT INVENTION

FIGS. 1A through 1F illustrate several embodiments of the composite filter medium 10 of the present invention useful for removing contaminants from a fluid, which generally comprises an adsorbent layer 11 and a hydrophilic particulate intercepting layer 19. Referring to the embodiment illustrated in FIG. 1A, the adsorbent layer 11 comprises an adsorbent supporting web substrate 12 having a front surface 14 and a back surface 15. At least a portion of the front surface 14 is coated with adsorbent particles 16 and binder particles 18 which are fused to the front surface 14 and to the adsorbent particles 16. The coating on the adsorbent supporting web substrate 12 is obtained according to a method which is described in co-pending U.S. patent application Ser. No. 08/813,055, filed on Mar. 3, 1997, which is incorporated in its entirety herein by reference. As basically described in the co-pending application, the coating is obtained by preparing a mixture of adsorbent particles and binder particles. Preferably, the binder particles have an average particle size not exceeding approximately 80 microns. The mixture is applied to part or all of the front surface 14 of the adsorbent supporting web substrate 12 to produce a loose powder coating on the front surface. The loose powder coating is heated to at least the Vicat softening temperature of the binder particles but below the melting temperature of the adsorbent supporting substrate 12 and the adsorbent particles to form softened binder particles 18. Pressure is applied to the web substrate 12 to cause the softened binder particles 18 to fuse with the adsorbent particles 16 and to the adsorbent supporting web substrate 12.

Figure 1A:
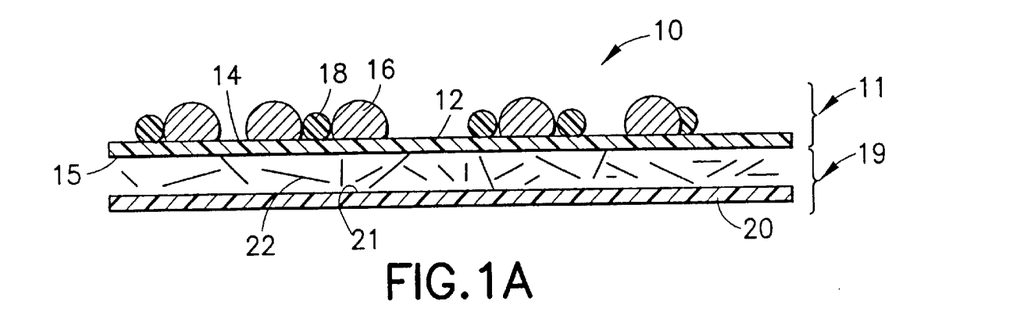
FIG. 1A, which is a sectional view of a first embodiment of the composite filter medium of the present invention.

The hydrophilic particulate intercepting layer 19 in the embodiment shown in FIG. 1A comprises a fiber supporting web substrate 20 having a front surface 21 positioned adjacent to the adsorbent supporting web substrate 12 such that its front surface faces the back surface of the adsorbent supporting web substrate. A mixture of glass micro fibers 22 and an FDA approved epoxy binder resin (not shown) is positioned between the back side 15 of the adsorbent supporting web substrate 12 and the front side 21 of the fiber supporting 20 web substrates. The glass fibers and binder resin may be adhered to one or both of the web substrates 12, 20 with a hot melt adhesive, if desired, and the resin is preferably treated to obtain a hydrophilic character. Also, those skilled in the art will now appreciate that the hydrophilic character of the particulate intercepting layer may be obtained in a number of ways including: adding surface active agents to the resin, glass micro fibers or supporting web substrates; post-treating the resulting composite medium to provide a surfactant on its surfaces; or using intrinsically hydrophilic materials, such as Nylon micro fibers.

Of course those skilled in the art will now appreciate that the steps for making the first embodiment illustrated in FIG. 1A can be taken out of order. For example, the mixture of glass fibers 22 and resin may be provided between the adsorbent supporting 12 and fiber supporting 20 web substrates prior to the application of the adsorbent particles 16 and the binder 18 on the adsorbent supporting web substrate 12 as described above. Laminated glass filter medium products made by Hollingsworth & Voss Company and marketed under the trademark HOVOGLAS may be used to form both the adsorbent supporting and fiber supporting web substrates having the glass micro fiber 22 and binder resin material therebetween. The adsorbent particles 16 and binder particles 18 may be applied to the laminated glass filter medium product according to the method steps described above. Alternatively, sheet-like adsorbent product manufactured and marketed by KX Industries under the trademark PLEKX may be suitably modified by providing the glass micro fiber and resin mixture between the back, uncoated side of the adsorbent supporting web PLEKX material and the front side of an adjacently placed fiber supporting web substrate.

Generally, non-woven fibrous materials, such as high strength spunbonded polyesters or polyolefins, wet or dry laid fibrous materials and porous membranes can be used to form the adsorbent supporting 12 and fiber supporting 20 web substrates illustrated in the FIG. 1A embodiment. Preferably, the adsorbent supporting web substrate 12 is formed from non-woven fibrous materials such as the high strength spunbonded polyesters and polyolefins and the fiber supporting web substrate 20 is formed from non-woven high strength spunbonded polyester. Materials such as iodinated resin, activated carbon, activated alumina, alumina-silicates, ion-exchange resins, and manganese or iron oxides can be used as adsorbent particles 16. Materials forming the binder particles 18 typically include thermoplastics such polypropylene, linear low density polyethylene, low density polyethylene and ethylene-vinyl acetate copolymer.

Figure 1B:
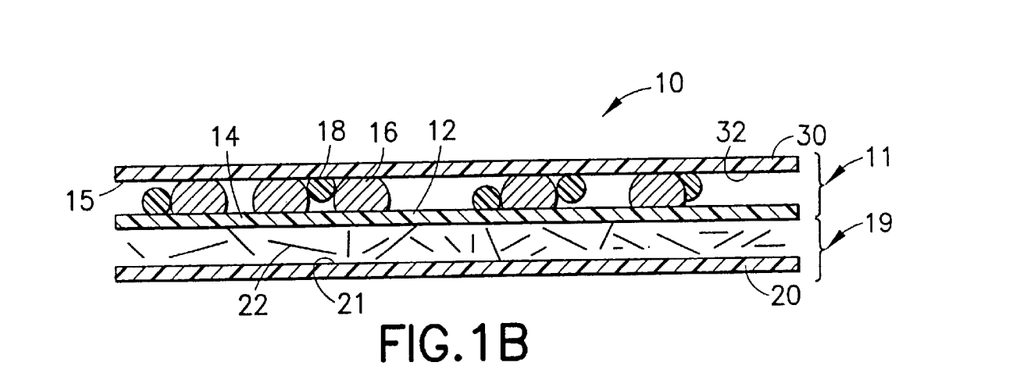
FIG. 1B, which is a sectional view of a second embodiment of the composite filter medium of the present invention.

Referring to the embodiment in FIG. 1B, the composite filter medium 10 of FIG. 1A can be modified to include an overlying web substrate 30 which has a surface 32 facing the front surface 14 of the particle supporting web substrate 12. The coating of binder particles 18 fused to the adsorbent particles and the surface 14 of the particles supporting web substrate 12 may also be fused to the surface 32 of the overlying web substrate 30. The fusing of the binder particles 18 to the particle supporting 12 and overlying 30 web substrates can be accomplished according to the disclosure in co-pending U.S. application Ser. No. 08/813,055. Essentially, after applying the mixture of particles to the surface of the adsorbent supporting web substrate 12 to produce a powder coating covering the portion of the surface thereof as described above, the overlying web substrate 30 is applied over the adsorbent supporting web substrate 12 and powder coating thereon. Preferably, the particle supporting web substrate 12, the overlying web substrate 30, and powder coating are heated to at least the Vicat softening temperature of the binder particles but below the melting temperature of the material forming the particle supporting web substrate, the overlying web substrate, the adsorbent particles and the binder. Once the binder particles are heated to the Vicat softening temperature, pressure is applied to the particle supporting 12 and overlying 30 web substrates to cause the softened binder particles to fuse with the adsorbent particles and the adjacent web substrates 12, 30. Those skilled in the art will appreciate that variations may be made in the process. For example, the adsorbent layer could be made by only heating the binder to the Vicat softening temperature before application thereof as a coating on the adsorbent supporting web substrate 12 and the application of the overlying web substrate 30. The embodiment illustrated in FIG. 1B also includes the fiber supporting web substrate 20 and the mixture of glass micro fibers 22 and binder resin between the fiber supporting web substrate 20 as described and illustrated with respect to the embodiment illustrated in FIG. 1A.

Figure 1C:
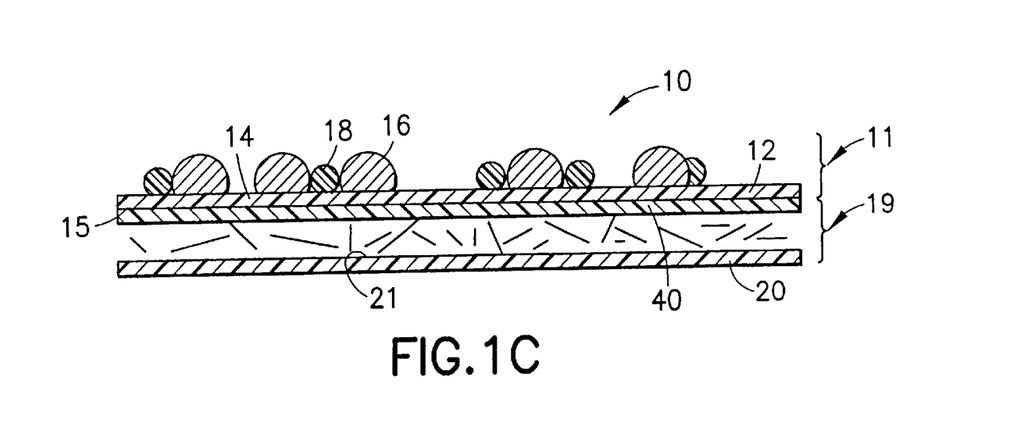
FIG. 1C, which is a sectional view of a third embodiment of the composite filter medium of the present invention.

FIG. 1C illustrates a third embodiment of the composite filter medium of the present invention. In this embodiment, the filter medium illustrated in FIG. 1A is modified by disposing an intermediate web substrate 40 between the glass micro fiber and resin mixture 22 and the back side 15 of the adsorbent supporting web substrate 12. This embodiment may be made by combining a single ply PLEKX sheet and the HOVOGLAS glass micro fiber laminate.

Figure 1D:
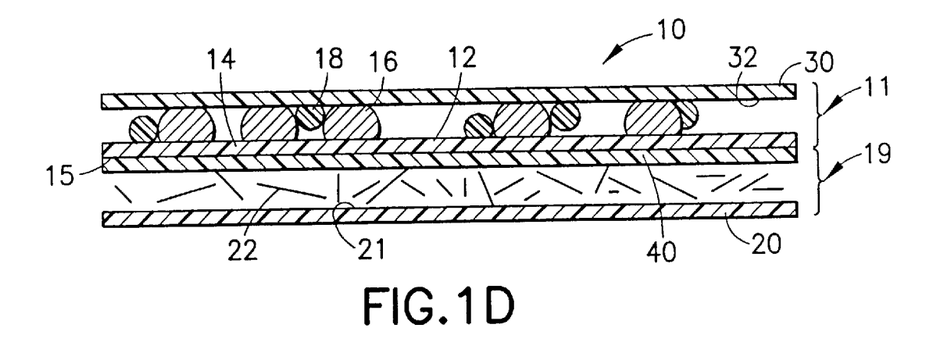
FIG. 1D, which is a sectional view of a fourth embodiment of the composite filter medium of the present invention.

FIG. 1D illustrates a fourth embodiment of the composite filter medium of the present invention. The embodiment illustrated in FIG. 1C is modified by including the overlying web substrate 30 which has the surface 32 facing the surface 14 of the particle supporting web substrate 12. The coating of binder particles 18 fused to the adsorbent particles and the surface 14 of the adsorbent supporting web substrate 12 are also fused to the surface 32 of the overlying web substrate 30 in the same manner as illustrated in the embodiment of FIG. 1B. This embodiment may be made by simply combining a two ply PLEKX sheet and the HOVOGLASS glass micro fiber laminate.

Figure 1E:
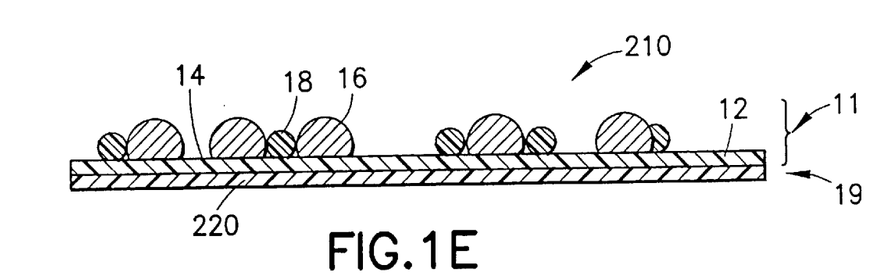
FIG. 1E, which is a sectional view of a fourth embodiment of the composite filter medium of the present invention.
Figure 1F:
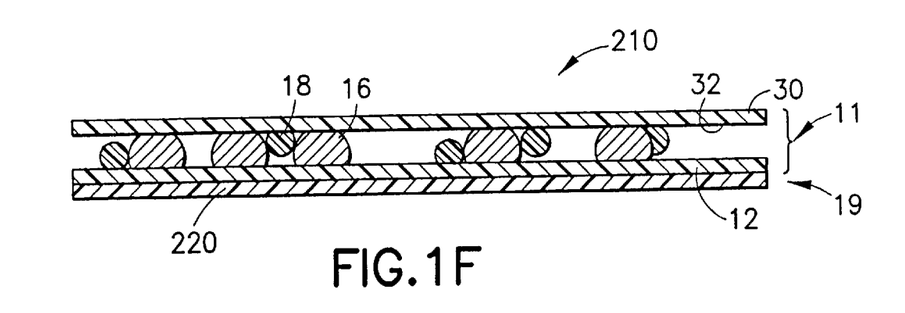
FIG. 1F, which is a sectional view of a fourth embodiment of the composite filter medium of the present invention.

FIGS. 1E through 1F illustrate other embodiments of the composite filter medium. In FIG. 1E, the composite medium 210 adsorbent layer 11 formed by an adsorbent supporting web substrate 12 having adsorbent particles 16 and binder particles 18 fused to the adsorbent particles 16 and to the surface 14 of the supporting web substrate 12. The particulate intercepting layer 19 is formed from a hydrophilic melt-blown micro fiber medium or any other suitable hydrophilic micro fiber structure. Also, the particulate intercepting layer 19 may be formed from a hydrophilic membrane such as a Supor® porous membrane made by Pall-Gelman Sciences of Ann Arbor, Mich. In the embodiment illustrated in FIG. 1F, the adsorbent layer also includes the overlying web substrate 30 and the binder particles 18 are fused to the surface 32 of the overlying web substrate that faces the surface 14 of the supporting web substrate 12. The particulate intercepting layer 19 may be formed from a hydrophilic melt-blown micro fiber medium or hydrophilic porous membrane as described above.

In commercially available filtering water carafes, a pressure drop of about no more than about 1 to 3 inches of water is available to push water through a filter medium. To make a high flow filter with the composite filter medium 10 of the present invention which is suitable for such end applications, the adsorbent layer 11 and the particulate intercepting layer 19 are selected from the materials described above such that when tested with a COULTER Porometer II, the composite filter medium has a mean flow pore diameter of about 1 to 10 microns, a bubble point in the range of about 3 to 15 microns and an air permeability rating of about 0.5 to 7 liters per minute/cm$^2$ with a pressure drop of about 0.1 bar. Mean flow pore diameter is the pore diameter at which 50 percent of the flow is through pores that are larger and 50 percent of the flow is through pores that are smaller. Bubble point indicates the largest pore size in the filter medium and air permeability is the flow rate of a gas through the sample at a given differential pressure. Those skilled in the art will appreciate that optimization of the composite filter medium in the various illustrated embodiments to obtain the above described flow properties can be achieved by one or more of the following: (1) varying the density, fiber diameter and basis weight of the glass micro fiber and resin mixture; (2) including or excluding the overlying substrate, the intermediate substrate or both; (3) varying the adsorbent and binder particle sizes, concentrations and lay down weights; and (4) varying the properties of the web substrate by use of different materials.

Figure 2A:
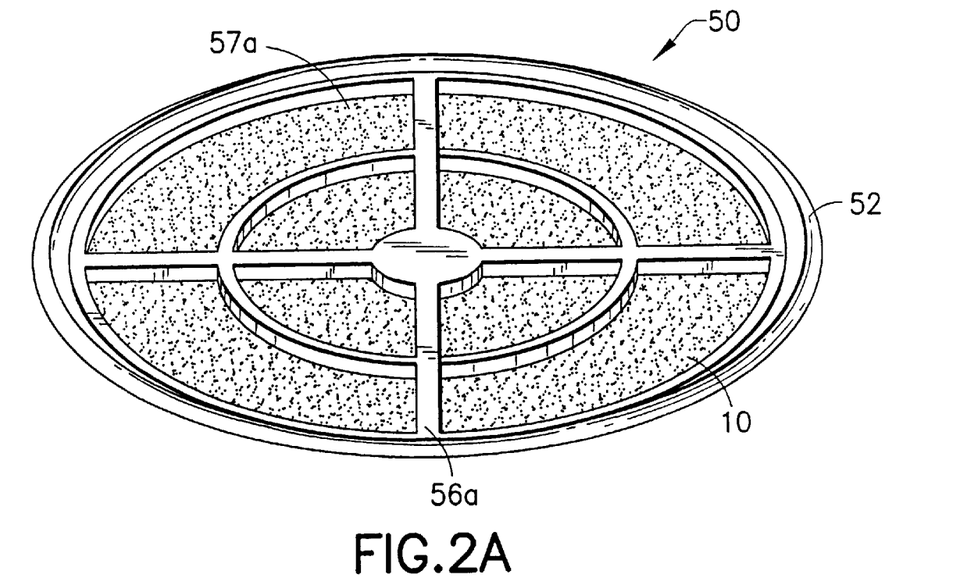
FIG. 2A, which is an isometric view of a flat sheet filter.
Figure 2B:
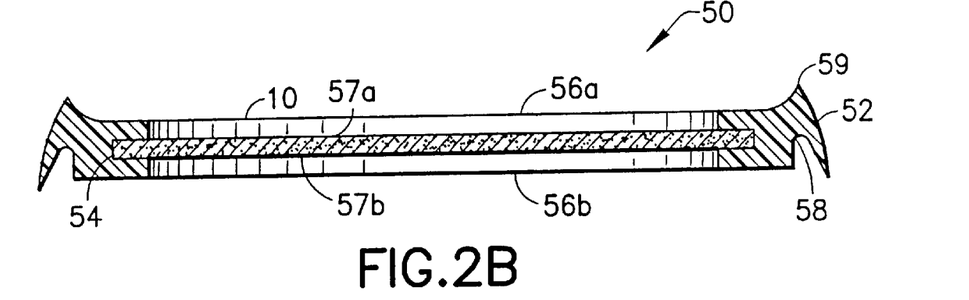
FIG. 2B, which is a partial cross-sectional view of the filter illustrated in FIG. 2A.

All of the embodiments of the composite filter medium illustrated in FIGS. 1A through 1F can be incorporated into a variety of fluid filter configurations. Examples of such fluid filter configurations are illustrated in FIGS. 2A through 5F. Referring to FIGS. 2A and 2B, the composite filter medium 10 of the present invention may be used in a simple flat sheet filter apparatus 50. The flat-sheet filter 50 includes a rim 52 which defines a filtration area. The composite filter medium 10 covers the filtration area defined by the rim 52. The edge 54 of the medium 10 is sealably affixed to the rim 52 by insert molding the rim over the edge 54 or by other suitable means such as affixation with a bead of hot melt adhesive between the edge 54 and the rim 52. In the embodiment illustrated in FIGS. 2A and 2B, the filter is provided with an inlet support member 56a on the inlet side 57a of the filter medium 10 and outlet support member 56b on the outlet side 57b of the filter medium 10. The support members 56a, 56b extend from the rim into the filtration area defined by the rim 52. Those skilled in the art will appreciate that only the inlet or outlet support member may be required for a particular filtering application and that such member maybe formed with any structural shape including that illustrated in FIG.

2A. A portion of the rim 52 on the outlet side 57b of the filter medium 10 may be provided with a groove 58 for sealably engaging with the rim of a container (not shown). To provide good sealing qualities, the rim may be formed from a resiliently deformable material such as rubber, thermoplastic elastomer or low density polyethylene. A portion of the rim on an inlet side 57a of the filter medium may be provided with a nesting ridge 59. A plurality of filters 50 may be stacked such that nesting ridge 59 of one filter may reside in the groove 58 of an adjacent filter and so on.

Figure 3A:
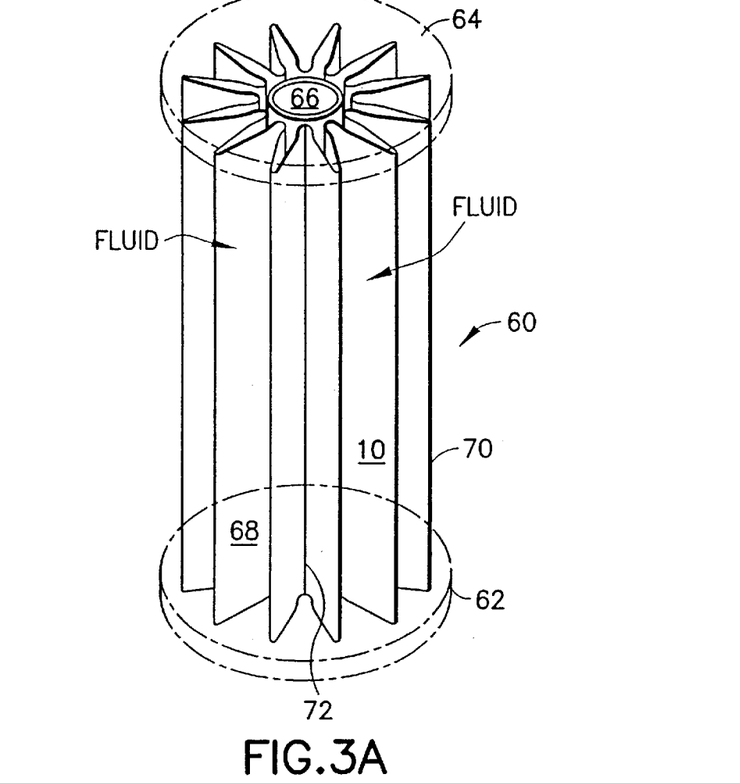
FIG. 3A, which is an isometric view of a basic cylindrical pleated filter.
Figure 3B:
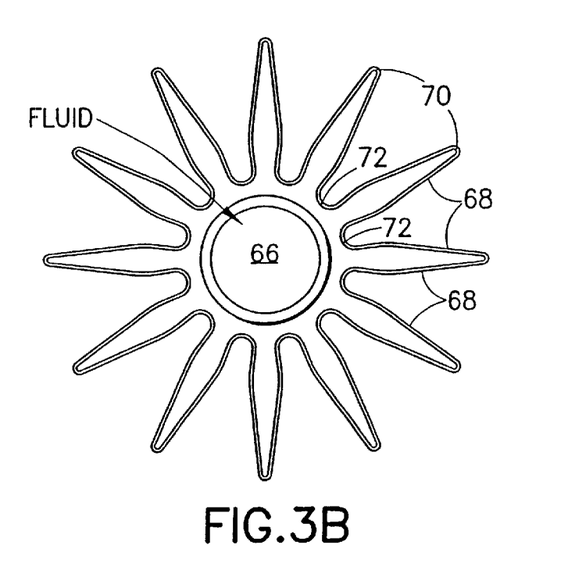
FIG. 3B, which is an axial cross-sectional view of the filter illustrated in FIG. 3A.

Referring to FIGS. 3A and 3B, the composite filtration medium 10 of the present invention may be used in a cylindrical pleated filter 60 for filtering contaminants from a fluid. In FIG. 3A, the filter has a base 62 (shown in dotted line) having an outlet opening therein (not shown). The filter 60 also includes a top 64 and a fluid permeable tube 66 extending from the base 62 to the top 64. The end of the tube adjacent to the base 62 is connected with the outlet opening in the base. The sheet-like filter medium 10 of the present invention may be sealably disposed in a generally cylindrical configuration between the base 62 and the top 64 and is provided with a plurality of outer radial pleats 70 that extend lengthwise from the base 62 to the top 64 and a plurality of inner radial pleats 72 located near the tube 66. The outer and inner radial pleats define a plurality of filtration panels 68. Fluid to be filtered may be caused to flow in a general direction from the outer radial pleats to the inner radial pleats and then to the tube as indicated by the flow arrows in the figures.

Figure 4A:
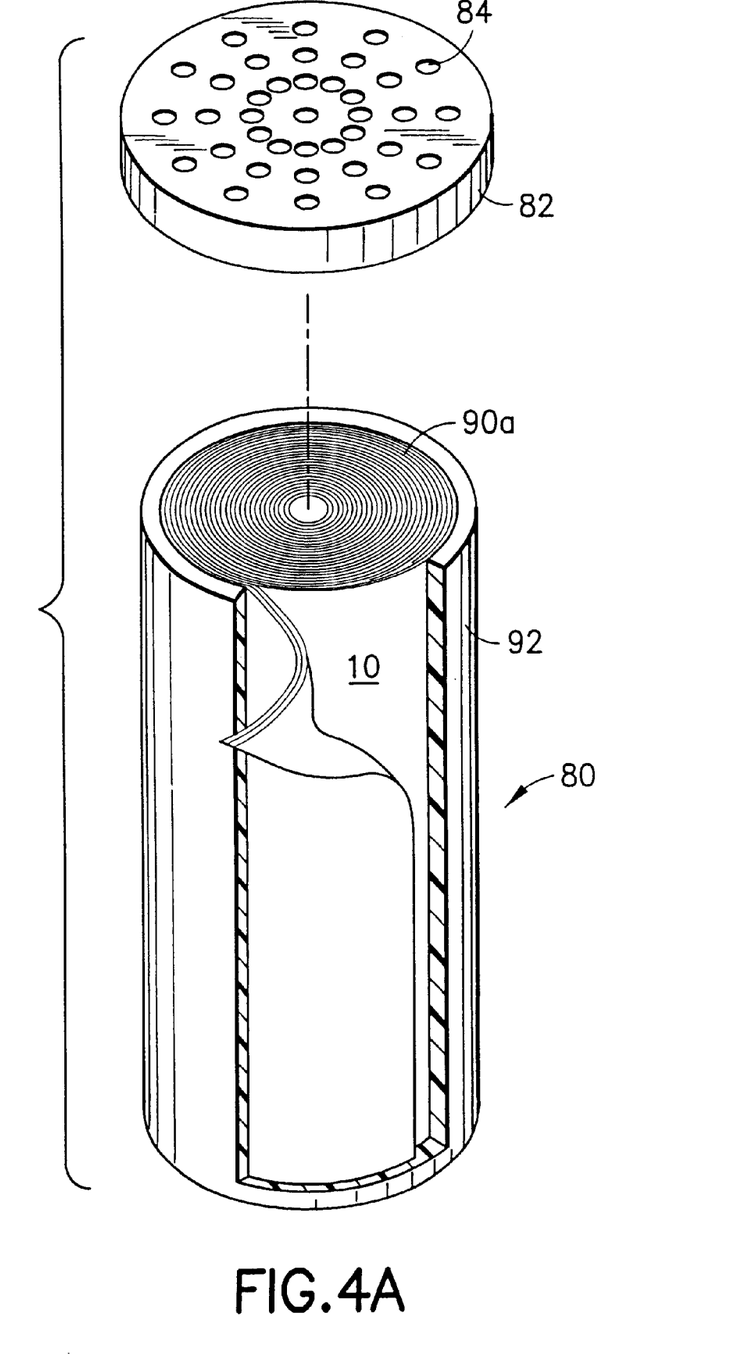
FIG. 4A, which is a partially cut away isometric view of a basic spiral wound filter.
Figure 4B:
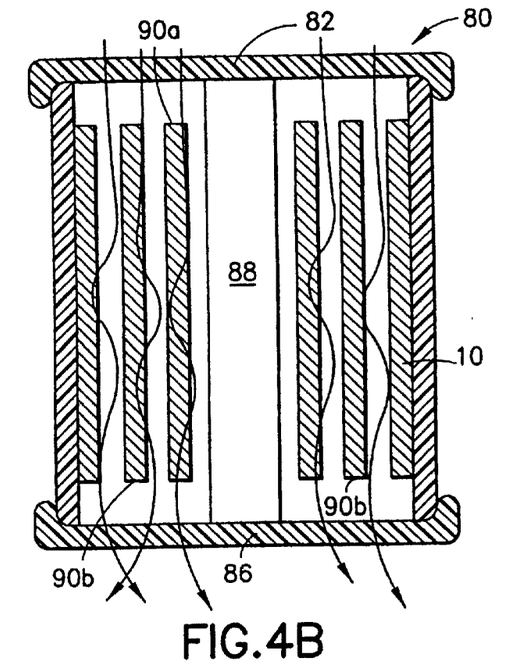
FIG. 4B, which is a cross-sectional view of a flow through filter medium configuration for the filter illustrated in FIG. 4A.
Figure 4C:
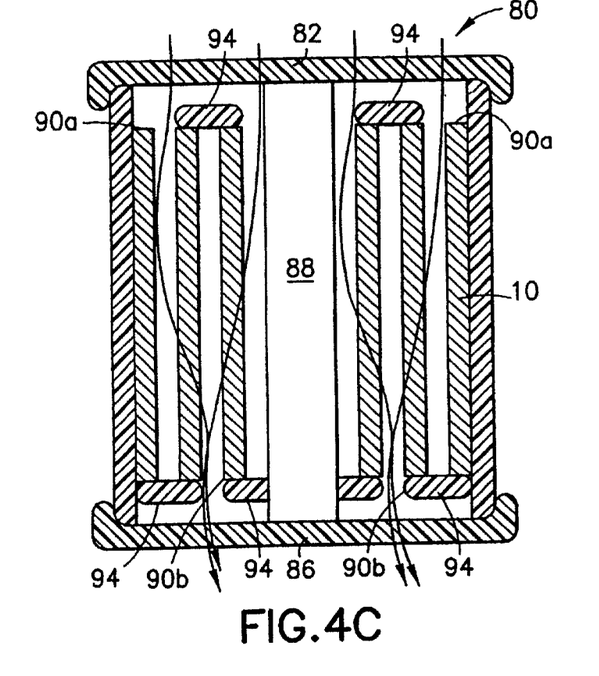
FIG. 4C, which is a cross-sectional view of a tangential flow filter medium configuration for the filter illustrated in FIG. 4A.

Referring to FIGS. 4A through 4C, the composite filter medium of the present invention may be used in a spiral wound filter configuration 80. The spiral wound filter configuration has a top 82 with a plurality of perforations 84 therein for permitting fluid to enter the filter. Similarly, the filter has bottom 86 which also has a plurality of perforations for permitting fluid to exit the filter. The top 82 and bottom 86 of the filter are held in a spaced apart relationship by a support tube 88 which extends from the top to the bottom. The sheet-like filter medium of the present invention 10 having a top edge 90a adjacent to the top and a bottom edge 90b adjacent to the bottom is spirally wound around the support tube 88. A cylindrical housing 92 extending from the top to the bottom is provided to cover and enclose the spirally wound filter medium 10.

In the embodiment in FIG. 4B, the fluid is permitted to flow tangentially relative to the filter medium 10 as shown by the flow arrows. However, this arrangement is generally only effective for chemical and heavy metals reduction and is not highly effective for the reduction of small particles. Referring to FIG. 4C, to force the fluid to flow through the filter medium before exiting the filter at the bottom 86 as shown by the flow arrows, alternating adjacent edges of the spiral wound filter medium are provided with barriers 94. The barriers 94 may be formed from a hot melt adhesive, polyurethane or other suitable material.

Referring to FIGS. 5A through 5F, the composite filter medium 10 of the present invention may be used to form a pleated panel filter 100 for filtering contaminants from a fluid. The panel filter 100 includes an outlet end panel 102 having an opening 104 therein. The composite filter medium 10 sealably covers the opening 104 of the outlet end panel. The composite filter medium 10 is pleated so as to have a first outward pleat 106a located remotely from the outlet end panel, an inward pleat 106b located closely to the outlet end panel, and a second outward pleat 106c located remotely from the outlet end panel. The pleats 106a–106c collectively define four filter medium panels. A first panel 108a extends between the outlet end panel 102 and the first outward pleat 106a. A second panel 108b extends from the first outward pleat 106a to the inward pleat 106b. A third panel 108c extends from the inward pleat 106b to the second outward pleat 106c. Finally, a fourth panel 108d extends from the second outward pleat 106c to the outlet end panel 102.

Figure 5A:
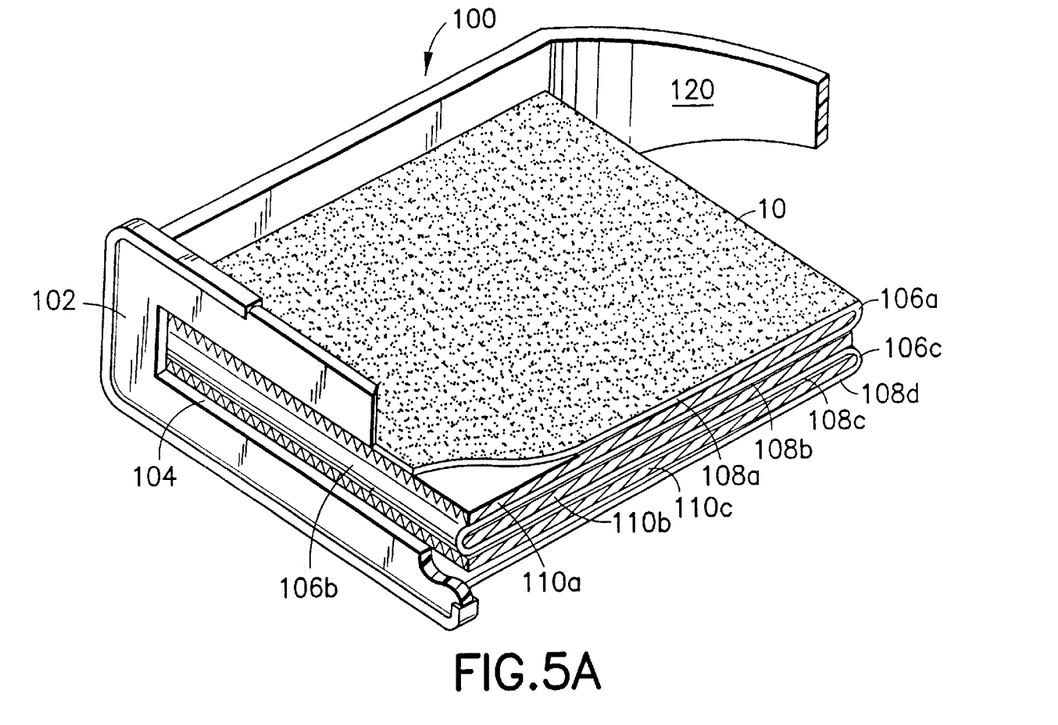
FIG. 5A, which is a cutaway perspective view of a pleated fluid filter employing the composite filter medium of the present invention.
Figure 5B:
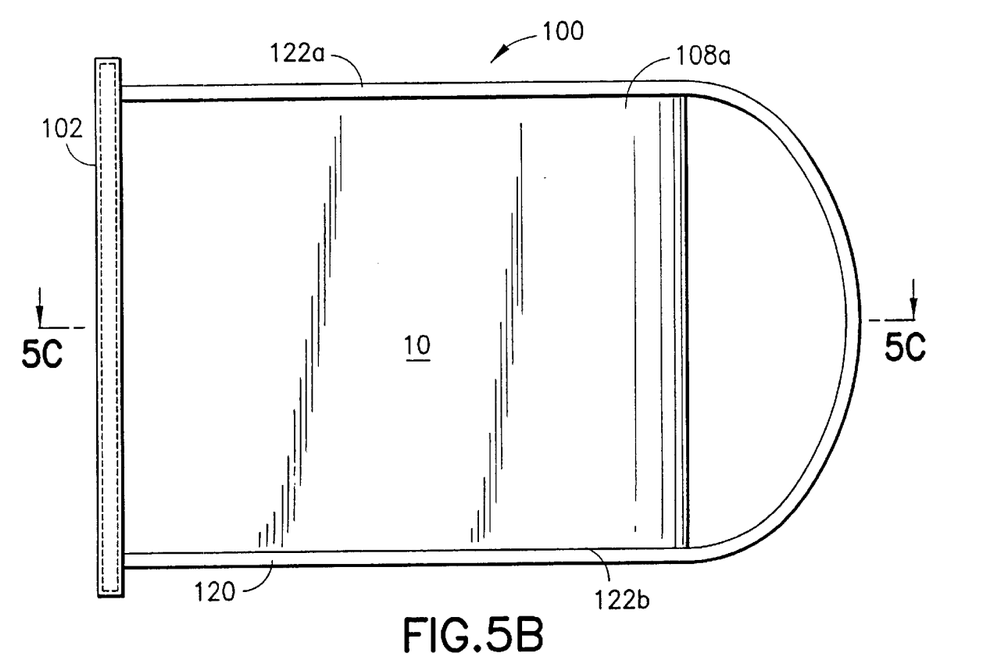
FIG. 5B, which is a top plan view of the filter illustrated in FIG. 5A.
Figure 5C:
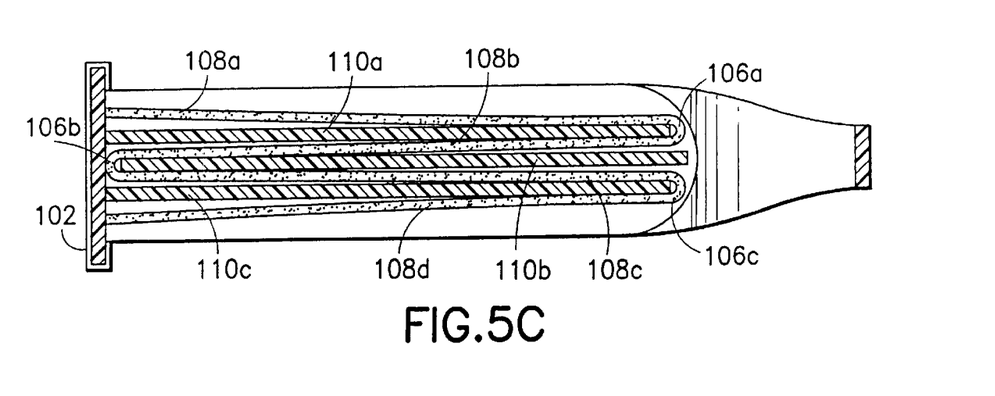
FIG. 5C, which is a cross-sectional view of the pleated filter illustrated in FIG. 5B, taken along the line 5C—5C.
Figure 5D:
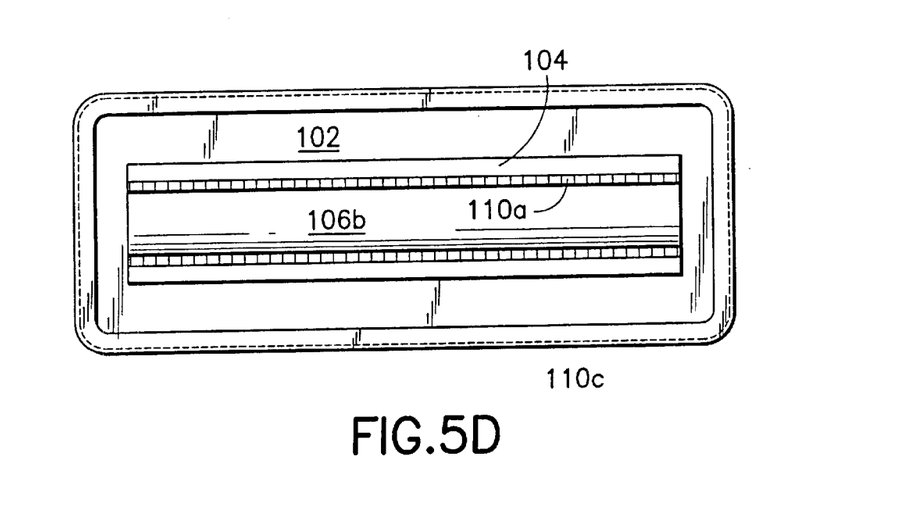
FIG. 5D, which is an end view of the filter illustrated in FIG. 5A showing the outlet end panel.
Figure 5E:
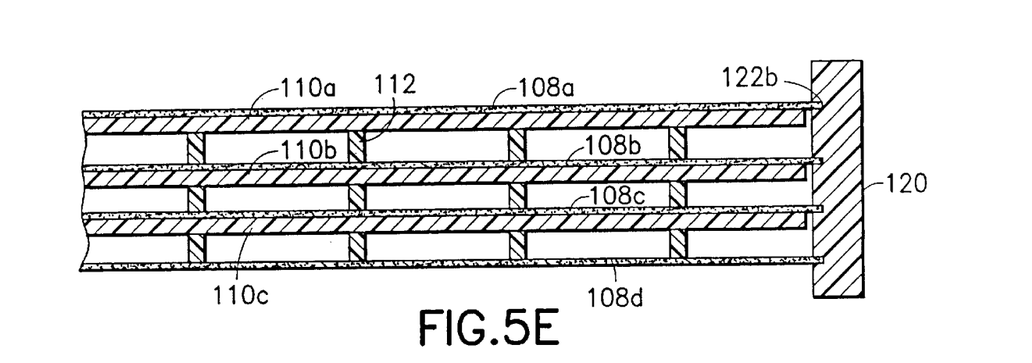
FIG. 5E, which is a partial cross-sectional view illustrating the edges of the pleated filter medium joined together by insert molding in a frame.
Figure 5F:
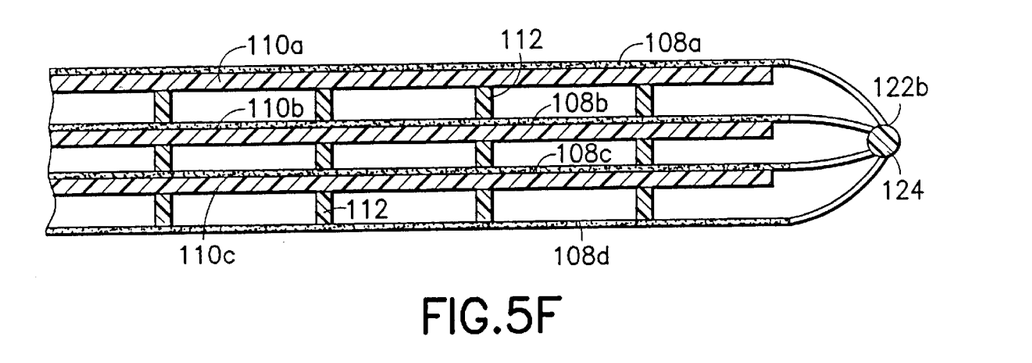
FIG. 5F, which is partial cross-sectional view illustrating the edges of the pleated filter medium joined together by a hot-melt adhesive.

When the panels 108a–108d are made to be relatively large due to the desire to have a high surface area of filter medium in the filter 100, the filter 100 may be provided with one or more drainage support members to prevent collapsing of the filter medium upon itself. If unsupported, collapsed filter surfaces would close and could increase the pressure drop across the filter and undesirably restrict fluid flow through the filter. As illustrated in FIGS. 5A and 5C, the filter is provided with a first drainage support member 110a disposed between the first and second filter panels 108a, 108b, a second drainage support member 110b disposed between the second and third filter panels 108b, 108c and a third drainage support member 110c disposed between the third and fourth filter panels 108c, 108d.

Figure 6:
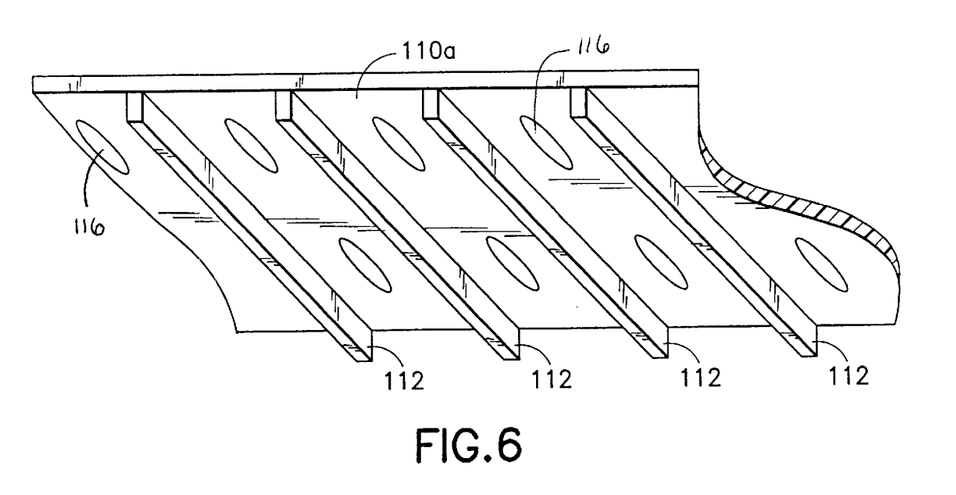
FIG. 6, which is a partial perspective view of a drainage directing support member.

Referring to FIG. 6, the support members, such as the first support Member 110a, may comprise a rigid or semi-rigid sheet 114 including one or more elongated ribs 112 extending from the surface of the member. The members may be disposed between the panels such that the elongated ribs 112 are aligned to point substantially towards the opening 104 in the outlet end panel 102 to direct the flow of fluid towards the opening 104. Apertures 116 may be provided in the sheet between the ribs 112 to permit fluid flow from one side of the drainage support member to the other. Materials sold by Applied Extrusion Technologies of Middletown, Del., under the trademark DELNET or by Amoco Fabrics Company of Atlanta, Ga., under the trademark VEXAR may be used as the drainage support members.

Referring to FIGS. 5A, 5B, 5E and 5F, the filter is further provided with a frame 120 extending from the outlet end panel 102. To sealably cover the opening in the outlet end panel 102, the edges 122a, 122b of the filter medium 10 may be attached to and supported by the frame 120. Alternatively, to sealably cover the opening in the outlet end panel 102, the respective edges 122a, 122b of the filter medium may be bonded together with a bead of hot melt adhesive 124.

Figure 7:
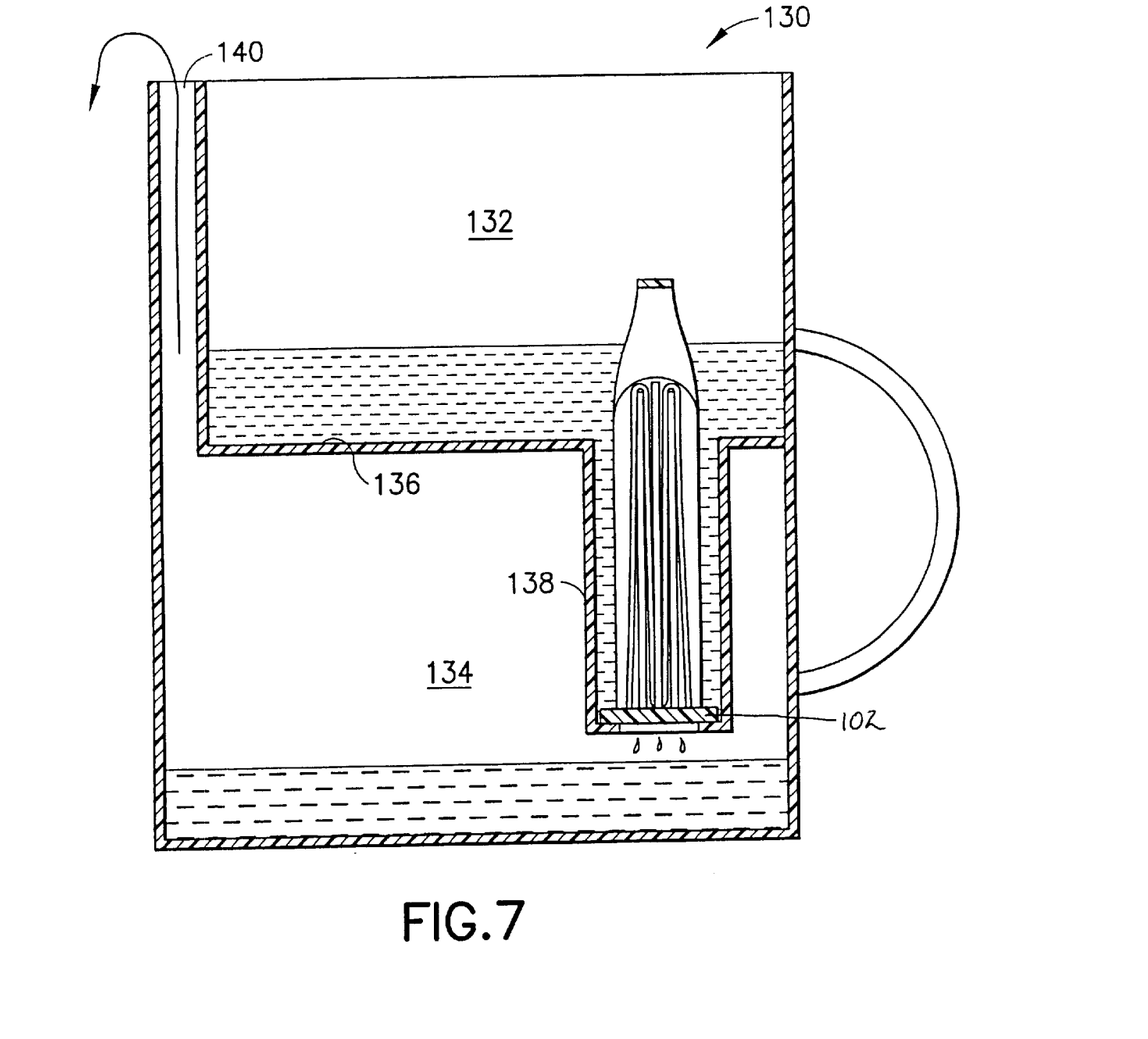
FIG. 7, which is a cross-sectional view of a carafe containing the filter of the illustrated in FIGS. 5A through 5F.

Any of the above described filters employing the filter medium of the present invention can be used in a gravity flow, filtering carafe. As shown in FIG. 7, such a carafe 130 is divided into an upper reservoir 132 and a lower reservoir 134 by a partition 136 that is provided with a filter receiving receptacle 138 having an opening (not shown) in the bottom thereof. A filter, such as the filter illustrated in FIGS. 5A through 5F, is inserted into the receptacle 138 so that it is supported on its outlet end panel 102 in the receptacle 138. A gasket (not shown) may be provided between the outlet end panel 102 and the bottom of the receptacle 138 to seal the upper reservoir from the bottom reservoir 134. When a quantity of water is poured into the upper reservoir 132, it flows under gravity through the filter containing the filter medium of the present invention into the lower reservoir 134. Filtered water may be poured from the lower reservoir via outlet 140.

As can be seen by the foregoing discussion, the filter medium of the present invention is very useful for making filters for water filtering carafes because it permits the use of filter configurations capable of providing high filtration flow rates with the several inches of water pressure that is typically available in such carafe filters. The high flow rate is a result of a substantially increased cross-sectional filter flow area (up to about 20 times) as compared to a traditional trapezoidal carafe filter element. Accordingly, because a greater cross-sectional flow area may be provided, the adsorbent bed depth presented to the flow of fluid can be reduced by up to 60 times as compared to conventional carafe filter elements.

Also, to take advantage of the increased cross-sectional area provided by the filter medium of the present invention, the size of adsorptive particles can be reduced from the size currently in use with conventional carafe filters. Because smaller particles provide better adsorption kinetics, the overall performance of the filter of the present invention can be greatly improved as compared to the conventional carafe filter under the same pressure drop and flow rate conditions. Use of small adsorbent particles that are more effective allows a substantial reduction in the volume of adsorbent required to meet performance goals. The low flow resistance provided by the filter medium of the present invention can be used to intercept very small particles, such as those within the 3 to 4 micrometer range, a range which is required to intercept waterborne pathogenic oocysts such as Giardia and *Cryptosporidium Parvum.*

As can be seen from the foregoing detailed description and drawings, the filter of the present invention permits high filtration flow rates to be obtained in low pressure environments, such as those typically found in gravity flow carafe filters. Although the filtering apparatus has been described with respect to one or more particular embodiments, it will be understood that other embodiments of the present invention may be employed without departing from the spirit and scope of the present invention. Hence, the present invention is deemed limited only by the appended claims and the reasonable interpretation thereof.

What is claimed is:

1. A filter medium comprising:
    a discrete adsorbent layer having a powdered mixture of a particulate adsorbing agent and a particulate binding agent coating a first supporting substrate, wherein said particulate binding agent interconnects said particulate adsorbent agent and fuses said powdered mixture to said first supporting substrate upon heating said powdered mixture to a t least a Vicat softening temperature of said particulate binding agent but below the melting temperature of said particulate adsorbing agent; and
    a discrete hydrophilic microparticulate intercepting layer disposed adjacent to said adsorbent layer having a second supporting substrate wherein a front surface of said second supporting substrate faces a back surface of said first supporting substrate,
    wherein said composite filter medium has a mean flow pore diameter of about 1 to 10 microns, a bubble point of about 3 to about 15 microns and an air permeability of about 0.5 to 7 liters per minute/cm2 with a pressure drop of about 0.1 bar.

2. The composite filter medium of claim 1, wherein the material forming said first supporting substrate is a non-woven fibrous material selected from the group consisting of spun bonded polymers, wet laid fibrous materials and dry laid fibrous materials.

3. The composite filter medium of claim 1, wherein the material forming said particulate absorbent agent is selected from the group consisting of iodinated resin, activated carbon, activated alumina, alumina-silicates, ion exchange resins, manganese oxide and iron oxide.

4. The composite filter medium of claim 1, wherein the material forming said particulate binding agent is a thermoplastic selected from the group consisting of polyolefins, polypropylene, low density polyethylene, linear low density polyethylene, ethylene vinyl acetate and high density polyethylene.

5. The composite filter medium of claim 1, wherein said adsorbent layer further comprises an overlaying web substrate, wherein the particulate binding agent is also overlaying web substrate.

6. The composite filter medium of claim 1, wherein said microoarticulate intercepting agent is a micro fiber and resin mixture.

7. The composite filter medium of claim 6, wherein the material forming the second supporting substrate is a non-woven fibrous material selected from the group consisting of spun bonded polymers, wet laid fibrous materials and dry laid fibrous materials.

8. The composite filter medium of claim 7, wherein an intermediate web substrate is disposed between the micro fiber and resin mixture and the first adsorbent supporting web substrate.

9. The composite filter medium of claim 8, wherein the material forming the intermediate web substrate is a non-woven fibrous material selected from the group consisting of spun bonded polymers, wet laid fibrous materials and dry laid fibrous materials.

10. The composite filter medium according to claim 1, wherein said composite filter medium removes from a fluid at least about 99.5 percent of particulates at a size in the 3 to 4 micron range, and wherein said composite filter medium removes dissolved chemical contaminants from said fluid.

11. A composite filter medium comprising:
    a layer having a powdered mixture of a particulate adsorbing agent and a particulate binding agent coating a first supporting substrate, wherein said particulate binding agent interconnects said particulate adsorbent agent and fuses said powdered mixture to said first supporting substrate upon heating said powdered mixture to a t least a Vicat softening temperature of said particulate binding agent but bellow the melting temperature of said particulate adsorbing agent; and
    a hydrophilic microparticulate intercepting layer comprising a hydrophilic melt blown microfiber medium,
    wherein said composite filter medium has a mean flow pore diameter of about 1 to 10 microns, a bubble point of about 3 to about 15 microns and an air permeability of about 0.5 to 7 liters per minute/cm2 with a pressure drop of about 0.1 bar.

* * * * *